United States Patent
Wang et al.

(10) Patent No.: US 11,182,678 B2
(45) Date of Patent: Nov. 23, 2021

(54) NAMED ENTITY RECOGNITION AND EXTRACTION USING GENETIC PROGRAMMING

(71) Applicant: ALIPAY (HANGZHOU) INFORMATION TECHNOLOGY CO., LTD., Zhejiang (CN)

(72) Inventors: Desheng Wang, Zhejiang (CN); Qian Jia, Zhejiang (CN); Yang Liu, Zhejiang (CN); Peng Zhang, Zhejiang (CN); Qian Zhang, Zhejiang (CN); Peng Zheng, Zhejiang (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/125,860

(22) Filed: Dec. 17, 2020

(65) Prior Publication Data

US 2021/0209480 A1  Jul. 8, 2021

Related U.S. Application Data

(63) Continuation of application No. PCT/CN2020/070723, filed on Jan. 7, 2020.

(51) Int. Cl.
*G06N 3/12* (2006.01)
*G06N 5/04* (2006.01)

(52) U.S. Cl.
CPC ............ *G06N 3/126* (2013.01); *G06N 5/04* (2013.01)

(58) Field of Classification Search
CPC ........ G06N 3/126; G06N 3/086; G06N 20/00; G06N 7/005; G05B 13/0265
(Continued)

(56) References Cited

U.S. PATENT DOCUMENTS

2009/0210366 A1  8/2009 Sakata et al.
2010/0205201 A1  8/2010 Krishnamurthy et al.
(Continued)

FOREIGN PATENT DOCUMENTS

CN  103793747 A  5/2014
CN  104408116 A  3/2015
(Continued)

OTHER PUBLICATIONS

Software release: an evolutionary and iterative approach, D Greer, G Ruhe; University of Calgary, Canada, pp. 243-253, Mar. 2004.*
(Continued)

*Primary Examiner* — Viker A Lamardo
(74) *Attorney, Agent, or Firm* — Seed IP Law Group LLP

(57) ABSTRACT

Disclosed herein are methods, systems, and apparatus, including computer programs encoded on computer storage media, for generating a pattern program using a genetic algorithm. The genetic algorithm operates on example data strings that represent the data categories to be recognized or extracted through named entity recognition. In the initialization stage, the initial pattern programs are generated based on example data strings that represent the data categories to be recognized or extracted through named entity recognition. Starting from the initial pattern programs, genetic operations are iteratively conducted to generate generations of offspring pattern programs. In each round of the genetic operation, offspring pattern programs are generated through the crossover operation and the mutation operation.

20 Claims, 5 Drawing Sheets

(58) Field of Classification Search
USPC .......................................................... 706/13
See application file for complete search history.

(56) References Cited

U.S. PATENT DOCUMENTS

| | | | |
|---|---|---|---|
| 2012/0089620 | A1 | 4/2012 | Castellanos et al. |
| 2015/0205783 | A1 | 7/2015 | Anisimovich |
| 2019/0325316 | A1 | 10/2019 | Anderson et al. |

FOREIGN PATENT DOCUMENTS

| | | |
|---|---|---|
| CN | 105740227 A | 7/2016 |
| CN | 108234347 A | 6/2018 |

OTHER PUBLICATIONS

Evolutionary model building under streaming data for classification tasks; opportunities and challenges, Malcolm I Heywood, York, 2014. pp. 283-326.*

Bartoli et al., "Inference of Regular Expressions for Text Extraction from Examples", *IEEE Transactions on Knowledge and Data Engineering*, vol. 28, No. 5, May 2016, pp. 1217-1230.

Bartoli et al., "Automatic Synthesis of Regular Expressions from Examples", *Computer*, vol. 47, Issue 12, Jul. 5, 2013, (16 pages).

Bartoli et al., "Learning Text Patterns Using Separate-and-Conquer Genetic Programming", Genetic Programming. EuroGP, Lecture Notes in Computer Science, vol. 9025, Jan. 2015, (12 pages).

Wang et al., "Revisiting Regex Generation for Modeling Industrial Applications by Incorporating Byte Pair Encoder," URL=https://arxiv.org/pdf/2005.02558v1.pdf, download date Jun. 11, 2021.

Vaggalis, "Automatically Generating Regular Expressions with Genetic Programming," URL=https://www.i-programmer.info/programming/perl/9503-automatically-generating-regular-expressions-with-genetic-programming.html, download date Jun. 14, 2021.

* cited by examiner

NAMED ENTITY RECOGNITION AND EXTRACTION USING GENETIC PROGRAMMING

BACKGROUND

Advances in network and storage-subsystem design continue to enable increasing scales of data streams be processed between and within computer systems. Meanwhile, the contents of such data streams are subjected to ever increasing scrutiny. For example, the collection, analysis and storage of personal data are subject to scrutiny and regulation. Organizations have to ensure that personal data is gathered legally and under strict conditions. Organizations that collect and manage personal data are obliged to protect it from misuse and illegal exploitation, and are obliged to respect the rights of data owners. Personal data or other sensitive data includes, but is not limited to, name, birth date, birth place, identification number, home address, credit card number, phone number, email address, URL, IP address, bank account number, etc.

Classification and extraction of personal data or other sensitive data from data streams involves named entity recognition. In general, named entity recognition is a task of information extraction that seeks to identify and classify atomic elements in texts into pre-defined categories such as personal name, personal identification (for example social security number "SSN" or resident identification number), home address, email address, bank account number, phone number, credit card number, etc. These pre-defined data categories are referred to as "named entities", or "entities" for short. The entities usually follow some types of syntactical patterns. Programs, e.g., regular expression, deterministic finite automata, or symbolic finite automata, are used to specify patterns in data streams. However, generating such programs typically involves significant amount of expert programming efforts, which is inefficient and slow. In the era of big data and cloud-based services, service providers or platforms face the needs to tackle entity recognition tasks on vast amount of varied categories of data streams, which cannot be handled by manual programming.

Therefore, there is a need to efficiently generate a program for named entity recognition tasks.

BRIEF SUMMARY

This specification describes technologies for generating a pattern program using a genetic algorithm. The genetic algorithm operates on example data strings that represent the data categories to be recognized or extracted through named entity recognition. Such example data strings are referred to as "positive example" data strings. The genetic algorithm may also operate on negative example data strings, which represent data strings that negate the positive example data strings, e.g., not targets of the named entity recognition task. In the initialization stage, the initial pattern programs are generated based on example data strings that represent the data categories to be recognized or extracted through named entity recognition. Starting from the initial pattern programs, genetic operations are iteratively conducted to generate generations of offspring pattern programs. In each round of the genetic operation, offspring pattern programs are generated through the crossover operation and the mutation operation. A small portion of randomly generated pattern programs are added into each generation of offspring pattern programs. A fitness function is used to determine the fitness scores of the pattern programs in each generation of offspring pattern programs. The fitness scores are used to filter the offspring pattern programs in a generation such that a population size of each generation of offspring pattern programs is maintained stable. For example, each generation includes a same number of offspring pattern programs. Upon the iterative genetic operations are completed, a pattern program with a highest fitness score is selected for the named entity recognition task.

If the genetic operations fail to generate a pattern program with desirable extraction behavior, the example data strings are classified into two or more sub-groups based on, e.g., the types or the lengths of each example data strings. The genetic operations are conducted on each sub-group of example data strings in parallel, which each generates a respective pattern program. The multiple pattern programs are linked through the "OR" function labels.

A fitness function includes one or more factors related to (1) conciseness of a pattern program; (2) a first matching rate of the pattern program on positive example data strings; (3) a second matching rate of the pattern program on negative example data strings; or (4) an edit distance between the pattern program and a positive example data string.

The genetic algorithm works on data strings that each exactly represents the target data categories of named entity recognition. These technical features bring about valuable technical advantages. First, a pattern program generated from the genetic algorithm will have a tailored extraction behavior because the good "genes" contained in the example data strings are efficiently caught and carried over through the genetic operations of the genetic algorithm. As such, the generated pattern program will correctly detect and extract data strings of the target data categories. Further, using such example data strings also reduces human inputs and errors in the process because there is no need to manually identify named entities from an unrepresentative data string. Also, the initial population of pattern programs is generated largely, e.g., 90%, from the example data strings, which substantially reduces the amount of iterative genetic operations required to achieve a satisfactory pattern program. This savings in computing resources is critical in managing large scale data streams in the era of big data and cloud-based data services.

Moreover, the fitness function considers whether a pattern program matches a negative example data string, which is not a target of a named entity recognition task. Resultantly, a pattern program selected based on the fitness function will avoid data categories that are represented by the negative example data strings. Therefore, the false positive errors will be substantially reduced, which makes the outcomes of the named entity recognition tasks more reliable and meaningful. As such, the techniques of the specification are efficient and suitable for conducting named entity recognition tasks on large scale data streams.

This specification also provides one or more non-transitory computer-readable storage media coupled to one or more processors and having instructions stored thereon, which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

This specification describes technologies for generating a pattern program using a genetic algorithm. The genetic algorithm operates on example data strings that represent the data categories to be recognized or extracted through named entity recognition. Such example data strings are referred to as "positive example" data strings. The genetic algorithm may also operate on negative example data strings, which represent data strings that negate the positive example data strings, e.g., not targets of the named entity recognition task. In the initialization stage, the initial pattern programs are generated based on example data strings that represent the data categories to be recognized or extracted through named entity recognition. Starting from the initial pattern programs, genetic operations are iteratively conducted to generate generations of offspring pattern programs. In each round of the genetic operation, offspring pattern programs are generated through the crossover operation and the mutation operation. A small portion of randomly generated pattern programs are added into each generation of offspring pattern programs. A fitness function is used to determine the fitness scores of the pattern programs in each generation of offspring pattern programs. The fitness scores are used to filter the offspring pattern programs in a generation such that a population size of each generation of offspring pattern programs is maintained stable. For example, each generation includes a same number of offspring pattern programs. Upon completion of the iterative genetic operations, a pattern program with a highest fitness score is selected for the named entity recognition task.

If the genetic operations fail to generate a pattern program with desirable extraction behavior, the example data strings are classified into two or more sub-groups based on, e.g., the types or the lengths of each example data strings. The genetic operations are conducted on each sub-group of example data strings in parallel, which each generates a respective pattern program. The multiple pattern programs are linked through the "OR" function labels.

A fitness function includes one or more factors related to (1) conciseness of a pattern program; (2) a first matching rate of the pattern program on positive example data strings; (3) a second matching rate of the pattern program on negative example data strings; or (4) an edit distance between the pattern program and a positive example data string.

The present specification is not limited to any particular embodiment, aspects, concepts, structures, functionalities or examples described herein. Rather, any of the embodiment, aspects, concepts, structures, functionalities or examples described herein are non-limiting, and the present specification may be used in various ways that provide benefits and advantages in computing, programming and data management in general.

Figure 1:
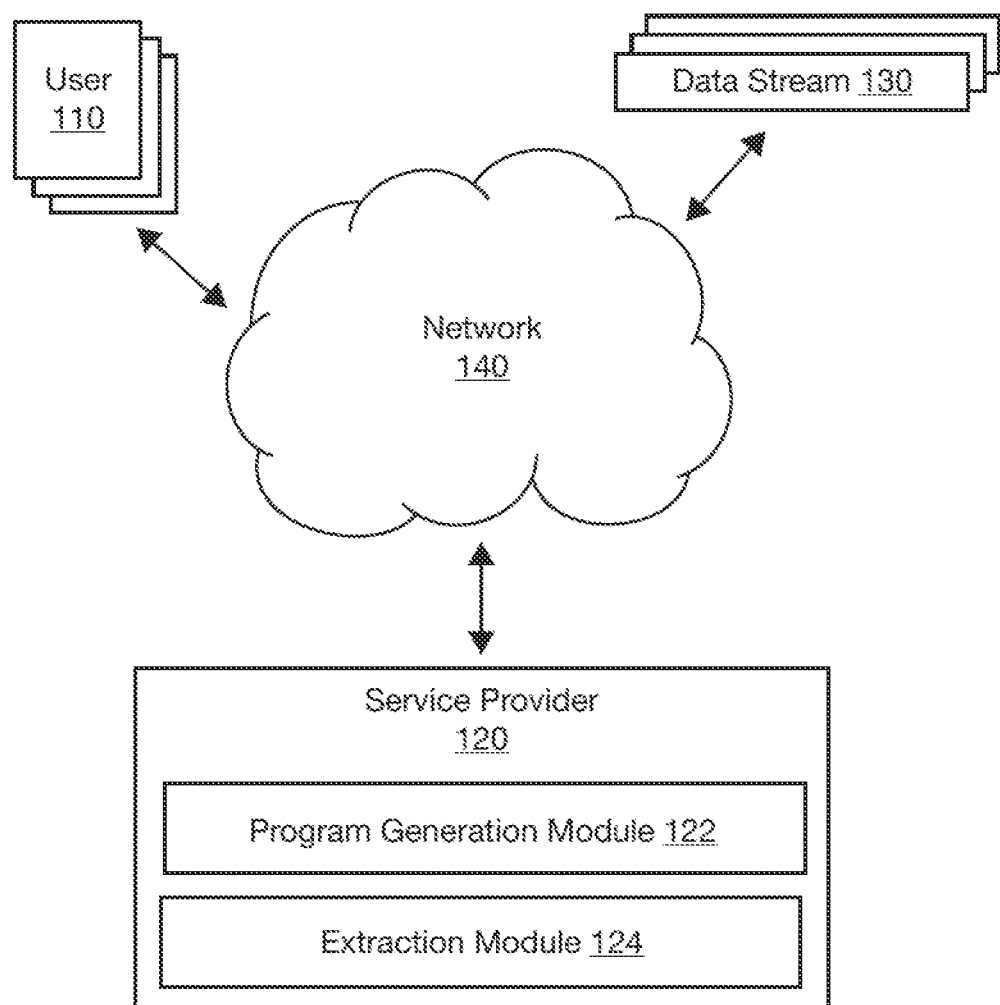
FIG. 1 is a diagram illustrating an example of an environment that can be used to execute embodiments of this specification.

FIG. 1 is an operation environment 100 for detecting data strings of target data categories from data streams, e.g., named entity recognition. The environment 100 includes one or more users 110, a service provider 120 and one or more sources of data streams 130, all communicating or logically connected to one another through a network 140. Each of the user 110 or the service provider 120 is a computing device such as a personal computer "PC", a server, a router, a network PC, a mobile device, a peer device or other common network nodes. The network 140 may be one or more local area networks ("LAN") and/or one or more wide area networks ("WAN") or other networks, which are configured as enterprise-wide computer networks, intranets or internet or other network applications. The user 110, the service provider 120 or the source of the data streams 130 are categorized based on the respective functions in the environment 100. The user 110, the service provider 120 or a source of the data streams 130 may physically reside on a same computing device or in physically separated computing devices. The user 110, the service provider 120 or a source of the data streams 130 may belong to a same individual or legal entity, or different individuals or legal entities. For example, a user 110 may be a business division of a financial technology company and may have sensitive data detection, recognition, and scrutiny tasks to perform on the data streams 130. The service provider 120 may be a technology service department of the same financial technology company or a third party service provider that provides services on named entity recognition.

Figure 2:
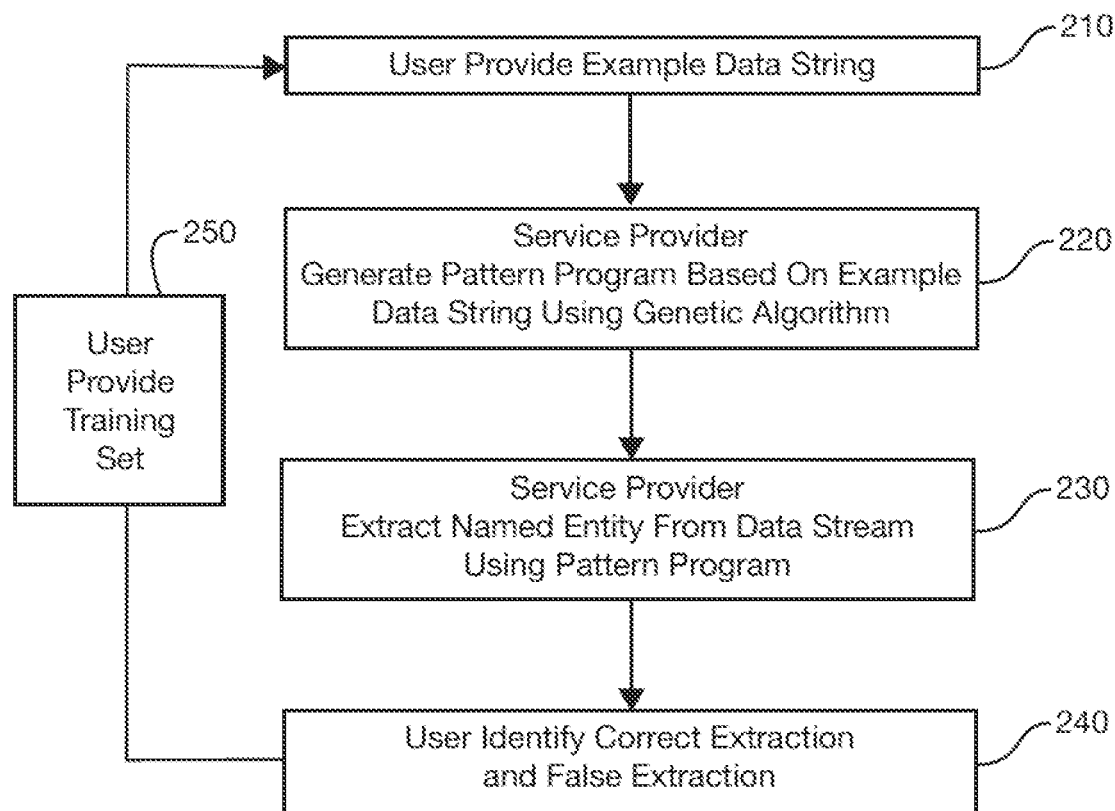
FIG. 2 is a diagram illustrating an example of an operation in accordance with embodiments of this specification.

FIG. 2 shows a flow diagram of a process flow 200 of the operations or interactions between/among the parties of the environment 100. With reference to FIGS. 1 and 2 together, in example operation 210, a user 110 designates or provides an initial set of example data strings to the service provider 120. A data string includes a combination of one or more letters, characters, signs, and/or other elements of expression. The initial set of example data strings contains examples that exactly represent target data categories the user 110 desires to extract or recognize from data streams 130. That is, an example data string does not contain any characters or data bits beyond the represented target data category.

A data stream 130 may be specific to a user 110 or may be shared or applicable to multiple users 110. Similarly, a user 110 may use two or more data streams 130. The user 110 may have a same or different named entity recognition tasks for each data stream 130. For different data streams 130, the user 110 may provide different initial sets of example data strings. As such, the user 110 may provide a named entity recognition task to the service provider 120, which specifies the applicable data stream 130 and the respective initial set of example data strings. The task may also specify the data categories of data strings to be recognized. The specified data categories may already be represented by the initial sets of example data strings or may be represented by further example data strings as described herein. For example, the user 110 may require that personal data be recognized from a data stream 130. Example personal data includes a person's name, birth date, birth place, identification number, home address, credit card number, phone number, email address, URL, IP address, bank account number, etc. In some embodiments, the user 110 provides example data strings of personal data to the service provider 120. The example data strings of personal data may include multiple categories of personal data, e.g., phone number, personal identification number, credit card number, etc. The example data strings of personal data may also include various data formats or pattern formats of a same category of personal data. For example, example phone numbers may include patterns of:

001.234.456.7899;
+1.234.456.7899;
1 234 456 7899;
(234) 456 7899;
234 456 7899.

In some embodiments, the example data strings each exactly contain a target data category itself. In some embodiments, at least some of the provided example data strings each contain a first snippet representing a target data category and a second snippet that does not represent a target category. The second snippet can provide a context for recognizing of the target data category as contained in the first set of snippets. The user 110 may identify the first snippet as representing a target data category. The user 110 may also specify the named entity recognition task for the service provider to identify the first snippet as representing a target data category. In some embodiments, the example data strings may also include data strings representative of data categories that are not targets for the named entity recognition tasks of a user 110. In the description herein, a "positive example data string" refers to an example data string representative of a target data category. A "negative example data string" refers to an example data string representative of a data category that is not a target for the named entity recognition tasks.

In example operation 220, the program generation module 122 generates a named entity recognition program based on the example data strings provided by the user 110 using a genetic algorithm. The generated named entity recognition program represents syntactical data patterns of the target data categories, and are referred to herein as "pattern program" for descriptive purposes. The pattern program may be in the form of a regular expression, a deterministic finite automata ("DFA"), a symbolic finite automata ("SFA") or other suitable programs representing syntactical data patterns. In some embodiments, the pattern program is generated via a genetic algorithm implemented by the program generation module 122 of the service provider 120. In the description herein, a regular expression is used as an example pattern program to illustrate the operation of the service provider 120 and/or the program generation module 122.

In some embodiments, the program generation module 122 performs an initializing operation, a synthesizing operation and a validation operation. In the initializing operation, an initial population of candidate programs is obtained. In some embodiments, a majority of the initial candidate programs are obtained based on the positive example data strings. For example, for each positive example data string, one or more candidate regular expressions are obtained, whose extraction behavior is consistent with a target data category represented by the positive example data string. It should be appreciated that for each target data category, multiple regular expressions can be generated. In some embodiments, some candidate programs are generated randomly. A ratio between the number of candidate programs obtained based on the positive example data strings and the number of randomly generated candidate programs is a parameter of the initializing operation, which can be adjusted. In some embodiments, the ratio is 9:1 such that the desirable extraction behavior or good "genes" of the positive example data strings are readily caught and carried over in the genetic operations. A population size, e.g., a total number of the candidate regular expressions, of the initial population of candidate regular expressions is another adjustable parameter of the initializing operation.

In the synthesizing or genetic operation, the initial candidate programs evolve through the operation of the genetic algorithm. The genetic algorithm is implemented in an iterative manner. In each round of the evolution, the candidate programs in a parent population are synthesized to create a child generation of candidate programs. The synthesizing may include crossover and mutation operations. A ratio between the child candidate programs generated from the crossover operations and the child candidate programs generated from the mutation operations is a parameter of the synthesizing, which can be adjusted. In some embodiments, the ratio is around 9:1 and may be adjusted to be larger or smaller than 9:1. The candidate programs are each evaluated by a fitness function to determine a fitness score. A fitness score indicates a degree that the extraction behavior of the pattern program is consistent with the target data categories represented by the example data strings or other data strings used in the calculation of the fitness scores. In some embodiments, the example data strings that are used to generate the initial candidate programs are also used to calculate the fitness scores of the initial or child candidate programs. In some embodiments, the example data strings that are provided by the user 110 are divided into two groups. One group of the example data strings are used to generate the initial candidate programs and the other group of the example data strings are used to calculate the fitness scores of the candidate programs. The latter approach may help to avoid overfitting issues, if any. In the description herein, for illustration purposes, the example data strings that are used to generate the initial candidate programs are also used to calculate the fitness scores of the candidate programs, which does not limit the scope of the specification.

In some embodiments, a candidate program's fitness score affects its use in the next round of the evolution, if any. For example, a new parent population of the candidate programs may be selected based on the fitness scores of the existing candidate programs. For example, the candidate programs with lower fitness scores may be filtered out as "unfit" to become parents for the next generation of evolution. In some examples, a candidate program's probability of being selected for crossover and/or mutation depends on the fitness score of the candidate program. For example, a candidate program with a higher fitness score will have a higher probability of mating with another candidate program in the crossover operation. A candidate program with a higher fitness score generally also has a higher probability of being selected for the mutation operation, although the probability variation on the mutation operation is less significant than the probability variation on the crossover operation.

In some embodiments, the new population of parent programs is selected only from the most recent generation of child candidate programs. In some embodiments, the new population of parent programs is selected from a pool of all existing candidate programs based on the fitness scores. For example, existing candidate programs of higher fitness scores are selected to form the new population of parent programs. In the description herein, a "parent generation" of candidate program refers to a generation of candidate programs that is used to generate new candidate programs under the synthesizing operation; and a "child generation" of candidate program refers to a generation of candidate programs that is generated from the synthesizing operation. A most recent child generation of candidate program may exactly overlap a new parent generation of candidate programs if the whole population of the most recent child generation is used for the next round of genetic operation. A "generation" of candidate programs is used as applicable to either one of a child generation or a parent generation of candidate programs.

In some embodiments, a generation of candidate programs also includes a percentage, e.g., in a range between 5% and 15%, of randomly generated candidate programs. The mixture of candidate programs generated via the genetic operation and the randomly generated candidate programs ensures that the "good genes" are maintained over generations and new "boosting genes" be introduced. Resultantly, fitness scores of the candidate programs are generally improved over generations. The synthesizing operation completes when a fitness score of a candidate program meets a first threshold value or a total number of the evolution rounds reaches a second threshold value. After the synthesizing operation completes, a candidate program with a highest fitness score is selected as a final pattern program to be used in the named entity recognition task. The final program may not necessarily be selected from the last generation of candidate programs. The final program may be selected from any generation of candidate programs.

The finiteness function may include various forms and criteria, which are all included within the scope of the specification. In some embodiments, a fitness function includes factors related to conciseness of a candidate regular expression (e.g., a length of the candidate expression); a first matching rate of the candidate regular expression on the positive example data strings; a second matching rate of the candidate regular expression on the negative example data strings; or an edit distance between the candidate regular expression and an example data string.

The first matching rate is calculated as a ratio between a number of the positive example data strings that are 100% matched by the candidate regular expression and the total number of the positive example data strings. The second matching rate is calculated as a ratio between a number of the negative example data strings that are 100% matched by the candidate regular expression and the total number of the negative example data strings. The edit distance is determined as the minimum number of edits that transfer an extracted data string into a target data category contained in a positive example data string. For example, in some embodiments, characters in an example data string that are matched by the extraction behavior of a candidate regular expression and the characters in the example data string that are missed by the extraction behavior of the candidate regular expression are analyzed to determine the edit distance of the candidate regular expression.

In example operation 230, the extraction module 124 uses the regular expression generated by the program generation module 122 to extract target data categories from the data streams 130. Specifically, the extraction module 124 finds data strings in the data stream 130 that matches the patterns represented by the regular expression. In some embodiments, a percentage matching threshold may be used in implementing the extraction operation. For example, if a data string in the data stream 130 includes characters or a snippet that matches the regular expression by a percentage higher than 55%, the extraction module 124 will extract the data string as belonging to the target data categories. The percentage matching threshold may be adjustable based on the configuration of the named entity recognition task, e.g., the tolerance on false positive or false negative designated by the user 110.

In example operation 240, the extracted or recognized data strings are provided to the user 110. The user 110 may examine the provided extraction results and may confirm the correct extractions and may identify the false extractions, e.g., false positive or false negative.

In the learning operation 250, the user 110 provides the correct extractions and/or the false extractions as training set to the service provider 120 to adjust the synthesizing operation. For example, the false positive extractions are used as additional negative example data strings in training the candidate programs. The false negative results, i.e., data strings in the target data categories that are not extracted by the regular expression, may be provided as additional positive example data strings. With the additional example data strings, scores of the candidate programs in various generation of the evolution may be recalculated, which changes the process and the results of the synthesizing operation. In some embodiments, the synthesizing operation is not adjusted at the launching point thereof, and is trained starting at a generation in the middle of the evolution process. In some embodiments, the fitness scores are only recalculated for all the candidate programs already generated in the evolution process, i.e., without further synthesizing operations, such that the recalculated fitness scores may lead to a different candidate program be selected as the final program and no new candidate program is generated. Other uses of the additional negative example data strings or additional positive example data strings are also possible and included within the scope of the specification. For example, the initial candidate pattern programs may be generated using different strategies than those initially used in the operation 220. As a result, a new regular expression is generated which has a higher fitness score than the previous regular expression used in the operation 240. The fitness scores of the new regular expression and the previous regular expression are calculated using same example data strings, e.g., at least one of the initial set of example data strings and the additional example data strings.

In some embodiments, the parameters of the genetic algorithm may be adjusted in the learning operation 250. For example, the ratio between the candidate programs generated from the positive example data strings and randomly generated candidate programs may be adjusted based on the feedback from the user 110 on the extraction results. For example, if the false negatives are representative by the initial positive example data strings, the learning process may lower the percentage of randomly generated candidate programs in the genetic operations so that the "genes" of the positive example data strings are better represented in the regular expression generated by the genetic operations.

Figure 3:
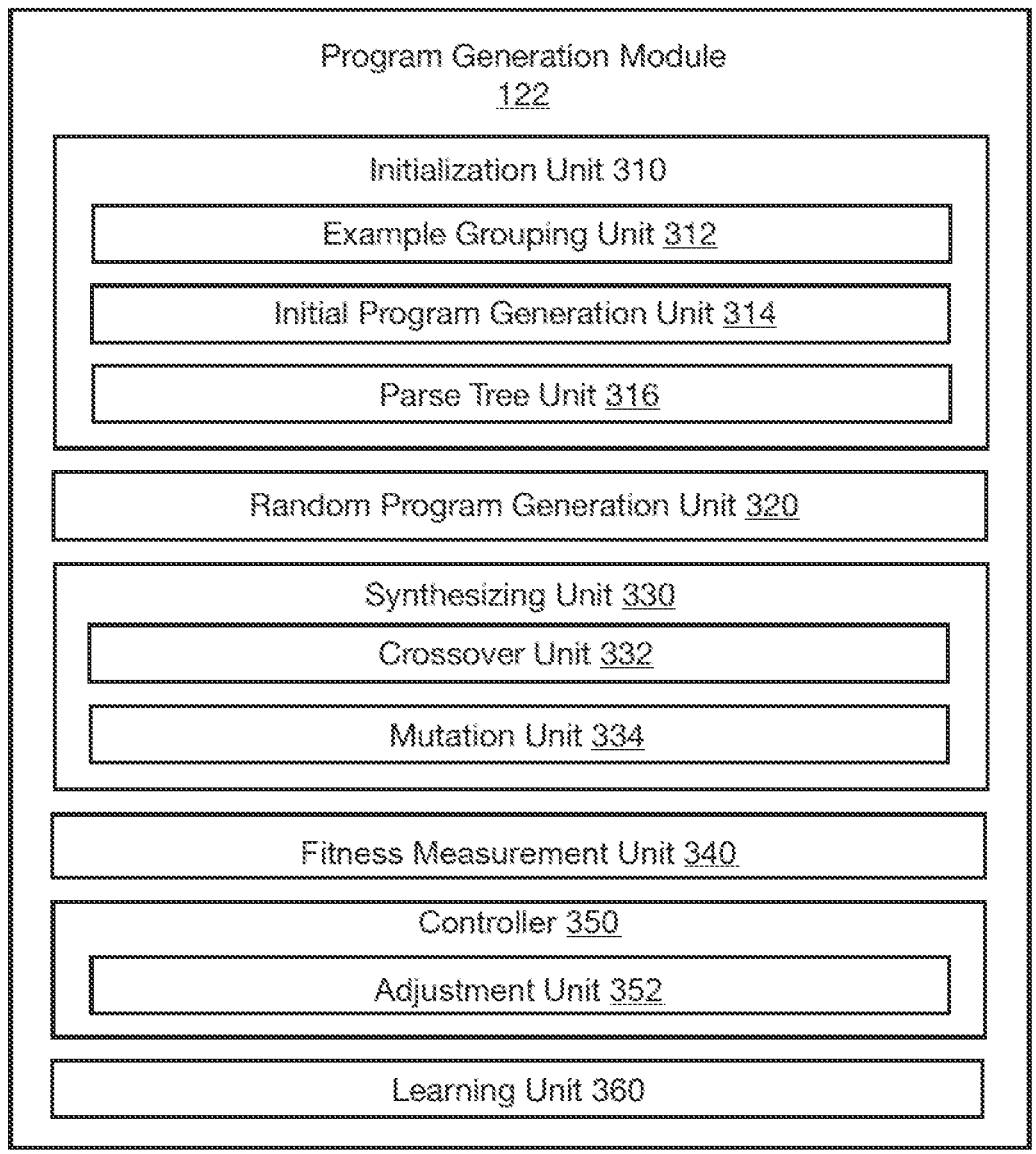
FIG. 3 is an example program generation module of generating pattern programs in accordance with embodiments of this specification.

FIG. 3 is an example program generation module 122. The program generation module 122 includes an initialization unit 310, a random program generation unit 320, a synthesizing unit 330, a fitness measurement unit 340, a controller 350, and a learning unit 360. The initialization unit 310 includes an example grouping unit 312, an initial program generation unit 314, and a parse tree unit 316. The synthesizing unit 330 includes a crossover unit 332 and a mutation unit 334. The controller 350 includes an adjustment unit 352.

In some embodiments, the program generation module 122 and the units thereof are computer executable instructions dedicated for respective functions and operation. The executable instructions include routines, programs, objects, components, and data structures, which when executed by a processor, enable the processor to perform particular tasks or implement particular abstract data types. The units of the program generation module 122 may reside on a same computing device or may reside on multiple computing devices functioning together in a distributed computing environment. In a distributed computing environment, the units of the program generation module 122 may be stored in local or remote computer storage media including computer memory devices.

Operations and functions of the software units of the program generation module 122 are further described herein.

Figure 4:
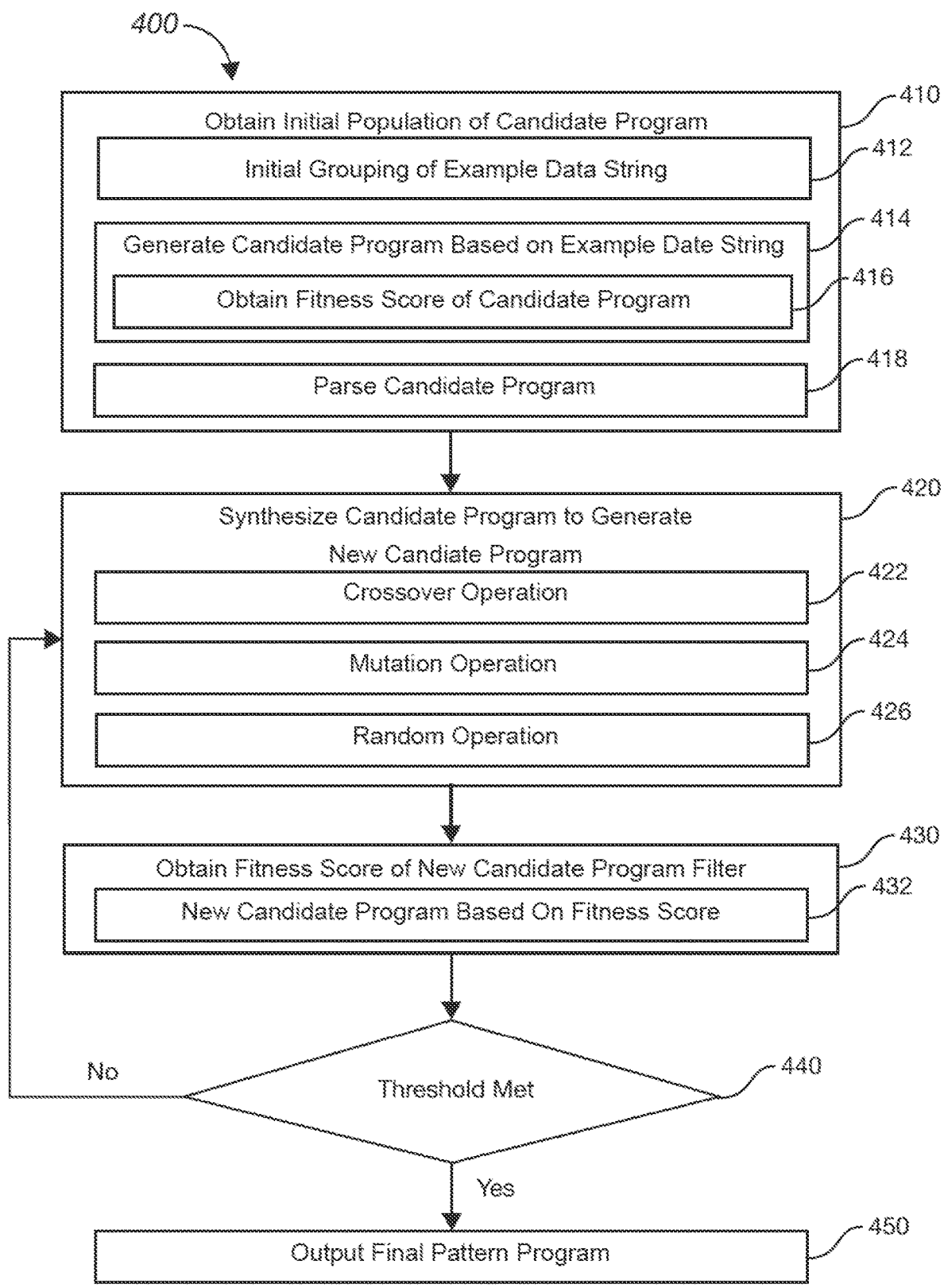
FIG. 4 schematically shows an example process of generating pattern programs using genetic algorithms in accordance with embodiments of this specification.

FIG. 4 shows an example process 400 of the program generation module 122 generating a regular expression based on example data strings provided by the user 110. In some embodiments, the example data strings include positive example data strings and negative example data strings. The positive example data strings each contains exactly an example target data category, e.g., an example birth date, an example social security number, an example resident identification number, an example bank account number, etc. The use of the example target data categories themselves as the positive examples data strings will simplify the operation of the genetic algorithm and will facilitate that the "good genes" of the example target data categories be carried over in the evolution process. The negative example data strings each do not contain a target data category. In some embodiments, some of the negative example data strings are counterexamples, which represent exceptions to a general characteristic of a target data category. For example, although data string "10.26.2050" appears to follow the data format of a birth date, the data string may be used as a counterexample of a birthdate because at the time of the operation, nobody has been born on the year of 2050. In some embodiments, the counterexample data strings each contain exactly a counterexample of a target data category without any other/ additional character. Inclusion of such counterexamples enables that the "bad genes" of the counterexamples be avoided in the evolution process of the genetic operations. The counterexample data strings may be identified or classified separately from other negative example data strings. In some embodiments, the example data strings initially received from a user 110 do not include any negative example data strings. In some embodiments, the example data strings received from a user 110 include only positive example data strings and counterexample data strings and do not include other negative example data strings.

The example process 400 is described with an example task of generating a regular expression based on example data strings, for illustrative purposes. In example act 410, the initialization unit 310 obtains an initial population of candidate regular expressions, which is referred to as the zero generation $G_0$ for descriptive purposes. The example act 410 includes sub-acts 412, 414 and 418. In sub-act 412, optionally, the example grouping unit 312 may conduct an initial grouping of the existing example data strings into initial groups with a goal that example data strings in a same initial group share a certain pattern characteristic to be represented by a same regular expression. For example, the initial grouping may be conducted based on the character class of the example data strings, e.g., whether an example data string contains word characters without digits, whether an example data string contains digits without word characters, or whether an example data string contains a mixture of digits and word characters. The initial grouping may also consider the natural language of the word characters, e.g., whether the word characters are Chinese, English, Japanese or Korean. The initial grouping may also consider the language family of the word characters, e.g., whether the word characters belongs to Celtic, Italic, Sinitic, Germanic, Slavic or other language families. The initial grouping may also consider the relevant target data categories represented by the example data strings. For example, example data strings of birth dates may include different formats like "mm-dd-yy"; "mm/dd/yy"; "dd-mm-yyyy"; "yyyy.mm.dd"; or other formats. The example data strings containing different formats of birth date information are grouped together. The initial grouping may also consider the length of the example data strings.

In some embodiments, the example grouping unit 312 assigns weights to each groups of example data strings. The weights may impact the analysis of candidate programs in the fitness scores and the match rates. The weights may also affect the amount of example data strings of each group that are actually used in the genetic operations. The weights assigned to each group of example data strings are adjustable, dynamically in the genetic operations of the operation 220 or in the learning operation 250. The assignment of weights to different groups of example data strings help to ensure that the more important target data categories have the priority of being represented in the regular expression generated by the genetic algorithm.

In some embodiments, the program generation module 122 operates to generate a single regular expression for all the target data categories represented by the positive example data strings. The grouping of the example data strings does not necessarily lead to the genetic operations being operated on each group of example data strings separately. However, based on the final or intermediary results of the genetic operations, the grouping of the example data strings may be adjusted and the genetic operations may be adjusted accordingly, which are described herein in detail.

In some embodiments, the initial grouping operation of the sub-act 412 is omitted. The program generation module 122, by default, will first try to generate a single regular expression that is able to extract all the target data categories represented by the example data strings. The example grouping unit 312 may group the example data strings based on the inputs or feedback from the adjustment unit 352 later in the operations of the genetic algorithm as described herein in detail.

In sub-act 414, the initial program generation unit 314 coordinates with the random program generation unit 320 to generate an initial population of candidate regular expressions, also referred to as "candidate programs." Specifically, in some embodiments, the initial program generation unit 314 generates candidate regular expressions based on the positive example data strings. The random program generation unit 320 generates candidate regular expressions randomly. In some embodiments, a ratio between a number of candidate regular expressions generated based on the positive example data strings and a number of randomly generated candidate regular expressions is maintained within a range between about 1:7 to about 1:10. In some embodiments, a ratio between the number of candidate regular expressions generated based on the positive example data strings and the number of randomly generated candidate regular expressions is 1:9. In some embodiments, the ratio is controlled by the controller 350. Experimental data shows that such a range of ratios helps to ensure that a final regular expression exhibits an extraction behavior that is consistent with those of the example data strings and further expends from those of the example data strings. In some embodiments, all the candidate regular expressions in the initial population are randomly generated and the example data strings provided by the user 110 are used in the genetic operations 420, 430 as described herein.

Regular expressions are typically described in a string describing the pattern it represents. A regular expression may include one or more elements of a literal, e.g., \a\; a character range, e.g., \[a-z]\; a negated character range, e.g., \[^a-z]\; a concatenation, e.g., \a[bc]\; an option operator, e.g., \a?\; a star operator, e.g., \a*\; a plus operator, e.g., \a+\; a non-greedy operators, e.g., \a??\, \a *? \, \a+? \; an alternation operator, e.g., \a|b \; or a capture group operator, e.g., \(ab) \.

For at least some of the positive example data strings, two or more candidate regular expressions are generated based on each of them. As an illustrative example, an example data string of "175.8" can be represented by regular expressions of:

r:=\d\d\d\.\d; or
r:=\d+\.\d.; or
r: =\[0-2]\d\d\.\d

Further, the candidate regular expressions generated for different positive example data strings may overlap. The overlapped regular expressions may be filtered out from the initial population or may be kept in the initial population to increase the possibility that the extraction behaviors of such candidate regular expressions or the "genes" be properly represented in the initial population and be sufficiently carried over in the evolution process.

In some embodiments, various strategies are considered in generating the initial population of regular expressions based on the positive example data strings. For example, a strategy may favor simplified regular expression over complicated regular expression. A strategy may try reducing or increasing the function labels or types of function labels used in a regular expression. Those strategies affect the final regular expression generated through the genetic operations, which may be adjusted in the learning operation 250.

In some embodiments, the population size of the initial population of candidate regular expressions is larger than the total number of the positive example data strings. For example, the population size is about 1.5-2 times the number n of positive example data strings.

In some embodiments, in procedure 416 of the sub-act 414, the fitness measurement unit 340 calculates a fitness score for each of the candidate regular expressions in the initial population. The fitness measurement unit 340 may use various suitable fitness algorithms to calculate the fitness scores, which are all included in the scope of the specification. In some embodiments, the fitness measurement unit 340 uses the below algorithm to calculate the fitness scores:

$$f(R)=\Sigma_{i=0}^{n}d(s_i,R(t_i))+\alpha \cdot l(R)+\beta \cdot p_+ - \gamma \cdot p_- \quad (1),$$

where, $t_i$ denotes a positive example data string; n is a total number of positive example data string; $s_i$ denotes a snippet contained in the positive example data string $t_i$ that is a target data category; $R(t_i)$ denotes a snippet extracted from the positive example data string $t_i$ by a regular expression; $d(x_1,x_2)$ denotes an edit distance between data string/snippet $x_1$, $x_2$; $l(R)$ denotes a length of a regular expression; $p_+$ denotes a rate that a regular expression matches the positive example data strings, e.g., $R(t_i)=s_i$; $p_-$ denotes a rate that a regular expression matches the negative example data string; and $\alpha$, $\beta$, $\gamma$ are constants, which can be adjusted by the controller 350. In some embodiments, $t_i=s_i$ because the positive example data strings are exactly representative of target data categories. It should be appreciated that although a big portion of the initial population of candidate regular expressions are each generated directly from one or more of the positive example data strings, they each may not be able to extract other positive example data strings. It should be appreciated that the data strings that are used for calculating the fitness score may be a different set or group of data strings from those used to generate the initial candidate programs.

In some embodiments, n may be the number of all example data strings; $t_i$ denotes an example data string; $s_i$ denotes a snippet contained in the example data string $t_i$ that is a target data category, while $s_i=0$ for a negative example data string not containing a target data category; $R(t_i)$ denotes a snippet extracted from the example data string $t_i$ by a regular expression; $d(x_1,x_2)$ denotes an edit distance between data string/snippet $x_1$, $x_2$.

In some embodiments, $\beta$, $\gamma$ are adjusted based on the error tolerance of the user 110. For example, if the user 110 balances toward false positive over false negative, $\beta$ will be increased. If the user 110 balances toward false negative over false positive, $\gamma$ will be increased.

In some embodiments, weights assigned to a group of example data strings may be introduced to the fitness function.

$$f(R)=\Sigma_{i=0}^{n}w_i \cdot d(s_i,R(t_i))+\alpha \cdot l(R)+ \beta \cdot \Sigma_{j=0}^{m}w_i \cdot p_{+j}-\gamma \cdot \Sigma_{j=0}^{m}w_i \cdot p_{-j} \quad (2),$$

where $w_i$ is a weight of an example data string $t_i$ that is equal to the weight assigned to the group $t_i$ belongs to; $w_j$ is a weight assigned to a group j of example data strings; $p_{+j}$ is a rate that a regular expression matches the positive example data string of group j; $p_{-j}$ is a rate that a regular expression matches the negative example data string of group j; and m is a total number of groups of example data strings.

In sub-act 418, the parse tree unit 316 parses each candidate regular expression in the initial $G_0$ generation. At least some of the candidate regular expressions are parsed into two or more components. In some embodiments, a parse tree is used to represent a regular expression parsed into two or more components. In some embodiments, a symbolic finite automata is used to represent a regular expression parsed into two or more components. Other approaches to represent a parsed regular expression and/or the correspondence between the two or more components of a parsed regular expression are also possible and included in the scope of the specification. In the description herein, a parse tree is used as an example to illustrate the operation of the program generation module 122, which does not limit the scope of the specification.

In some embodiments, the parse tree is a constituency-based parse tree that includes terminal nodes and nonterminal nodes. Leave nodes (terminal nodes) of the parse tree are labeled with terminals, representing the components of the regular expression that have been parsed. The leave nodes each does not have any children, and cannot be expanded any further. When the leave nodes are concatenated together, the candidate regular expression is obtained. Each internal or non-leaf node (nonterminal node) of a parse tree is labeled with a nonterminal label. A nonterminal label may include a placeholder label c and a function label. The immediate children of the internal node must follow a pattern of the function label's production rule in the grammar. The placeholder label c indicates a "place" of the associated child node. A function label indicates a functional relationship of a place c or a functional relationship between/among multiple places c. For example (c1c2) indicates that child nodes associated to the two placeholders c1, c2 be concatenated; and ^c indicates that the child node associated with the placeholder c be negated. In some embodiments, a string transformation approach is used form the parse tree. The string transformation of an internal node is achieved by replacing a placeholder c with a string transformation result of the child node associated with the placeholder c. Other approaches to form a parse tree based on a regular expression are also possible and included in the scope of the specification.

In example act 420, the synthesizing unit 330 synthesizes the candidate programs in a parent Gp generation of candidate programs to produce a child Gp+1 generation of candidate programs. The synthesizing includes crossover and mutation operations on the parent generation of candidate programs. A crossover operation interleaves two or more parent candidate programs into two or more new candidate programs by recombining components or gene values of the two or more parent candidate programs to generate "child" candidate programs that each includes components from each parents. For example, in a case that parent candidate programs are represented as parse trees, the sub-trees or branches of the parent parse trees may be recombined to generate child parse trees. A mutation operation alters one or more components or gene values of a parent candidate program to generate a child candidate program. For example, in a case that a parent candidate program is represented as a parse tree, a sub-tree or a branch of the parse tree may be replaced with a randomly generated sub-tree or branch to generate a child candidate program. A function of the mutation operation is to improve diversity of the population of candidate programs.

In some embodiments, the fitness scores of candidate programs are considered in selecting the candidate programs for the mutation and the crossover operations. For example, a candidate program's chance of being selected to mate with another candidate program for the crossover operation may be in line with its fitness score. That is, a candidate program of a higher fitness score will have a higher chance to mate with another candidate program in the crossover operation than a candidate program of a lower fitness score. As such, the "good gene," e.g., the suitable extraction behavior, can be carried over to the next generation. In some embodiments, a candidate program of a lower fitness score will have a higher probability of being selected for the mutation operation than being selected for the crossover operation. This increases the chance that a "good gene" be introduced to the population of candidate programs. In some embodiments, a candidate program of a higher fitness score will have a higher probability of being selected for the mutation operation than a candidate program of a lower fitness score.

In some embodiments, the child Gp+1 generation of candidate program also includes a small portion of randomly generated candidate programs by the random program generation unit 320.

In some embodiments, the child Gp+1 generation of candidate programs has a same number of candidate programs as the parent Gp generation of candidate programs. In a case where the synthesizing operations initially generate more candidate programs than the needed number, the generated candidate programs are filtered by their fitness scores. The candidate programs with lower fitness scores are filtered out until the child Gp+1 generation of candidate programs has a same population size as the parent Gp generation.

In some embodiments, the child Gp+1 generation of candidate programs include a first subset of candidate programs that are generated through the crossover operation; a second subset of candidate programs that are generated through the mutation operation; and a third subset of candidate programs that are randomly generated. In some embodiments, a ratio among the first subset, the second subset and the third subset of candidate programs in the number of candidate programs contained in each subset is maintained as substantially the same among all the generations of candidate programs other than the initial generation $G_0$. For example, the ratio among the first subset, the second subset and the third subset is in a range between 3:1:1 and 18:1:1. The size ratio may be controlled through the number of candidate programs generated through each of the crossover operation, the mutation operation or random operation. The size ratio may also be controlled through selectively filtering out the candidate programs with lower fitness scores in each subset.

In some embodiments, a ratio between the first subset of candidate programs generated through the crossover operations and the second subset of candidate programs generated through the mutation operations are determined based on the initial analysis of the example data strings. For example, in a case that the example data strings are more homogeneous, e.g., in the lengths of the example data strings or the data categories represented by the example data strings, the size of the first subset will increase. In a case that the example data strings are more heterogeneous, the size of the second subset will increase.

In example sub-act 422, the crossover unit 332 conducts the crossover operation. As illustrated in the example used herein, the candidate programs are regular expressions and are each represented as parse trees, which are suitable data structures for crossover operations. The crossover operation may be conducted in various ways of recombining components of the mated parent programs. For example, one or more of the single point crossover, two-point crossover (or k-point crossover), or uniform crossover may be used. Further, the function labels of the parse tree may be considered in the crossover operation. For example, one or more of partially matched crossover, cycle crossover, order crossover, order-based crossover, position-based crossover, voting recombination crossover, alternating-position crossover, or sequential constructive crossover may be used to properly handle the function labels in a parse tree.

In some embodiments, for a mated candidate program that is represented as a parse tree, a subtree/branch of the parse tree is randomly selected for recombination in a crossover operation. That is, when an internal node is selected, the whole branch below the selected internal node, i.e., all the child nodes under the internal node, is used for the recombination in the crossover operation. In some other embodiments, a node of a parse tree is randomly selected, and only the selected node is used for recombination in a crossover operation. The child nodes, if any, of the selected node will not be used for recombination.

In some embodiments, only the leaf nodes (or terminal nodes) of a parse tree are possibly selected for recombination in a crossover operation. The leaf nodes are randomly selected or are selected based on some constraints. For example, the chance of a leaf node being selected relates to the distance between the leaf node and the root node of the parse tree. In some embodiments, a leaf node that is positioned farther from the root node, e.g., more internal nodes therebetween, has a higher chance of being selected for recombination. In some other embodiments, a leaf node that is positioned farther from the root node has a lower chance of being selected for recombination.

In some embodiments, a chance of an internal node being selected for recombination is related to a height of the internal node, e.g., a longest distance between the internal node and a leaf node under the internal node. For example, an internal node of a larger height may be more likely to be selected for recombination. For another example, an internal node of a larger height may be less likely to be selected for recombination.

Other approaches of selecting nodes in a parse tree for recombination are also possible and included in the scope of the specification. In some embodiments, the approaches of selecting components of a candidate program for recombination can be configured and adjusted by the controller 350 as described herein.

In example sub-act 424, the mutation unit 334 conducts mutation operations on candidate programs selected for the mutation operation. As illustrated in the example used herein, the candidate programs are regular expressions and are each represented as parse trees, which are suitable data structures for mutation operations. The mutation operation may be conducted in various ways as controlled by the controller 350, which are all included in the scope of the specification. For example, one or more of the bit string mutation, flip bit mutation, boundary mutation, non-uniform mutation, uniform mutation, Gaussian mutation, or shrink mutation may be used.

In some embodiments, for a candidate program that is represented as a parse tree, a subtree/branch of the parse tree is randomly selected for a mutation operation. A randomly generated sub-tree or branch will replace the selected subtree. That is, when an internal node is selected, the whole branch below the selected internal node, i.e., all the child nodes under the internal node, is replaced by another subtree in the mutation operation. In some other embodiments, a node of a parse tree is randomly selected, and only the selected node is replaced by another randomly generated node. For example, a function label of the nonterminal label may be replaced by a randomly generated function label. The child nodes, if any, of the selected node will not be used for mutation.

In some embodiments, only the leaf nodes (or terminal nodes) of a parse tree are possibly selected for mutation. The leaf nodes are randomly selected or are selected based on some constraints. For example, the chance of a leaf node being selected relates to the distance between the leaf node and the root node of the parse tree. In some embodiments, a leaf node that is positioned farther from the root node, e.g., more internal nodes therebetween, has a higher chance of being selected for mutation. In some other embodiments, a leaf node that is positioned farther from the root node has a lower odd of being selected for mutation.

In some embodiments, a chance of an internal node being selected for mutation relates to a height of the internal node, e.g., a longest distance between the internal node and a leaf node under the internal node. For example, an internal node of a larger height may be more likely to be selected for mutation. For another example, an internal node of a larger height may be less likely to be selected for mutation.

Other approaches of selecting nodes in a parse tree for mutation operation are also possible and included in the scope of the specification. In some embodiments, the approaches of selecting components of a candidate program for the mutation can be configured and adjusted by the controller 350 as described herein.

In example sub-act 426, the random program generation unit 320 randomly generates candidate programs for the Gp+1 generation.

In example act 430, the fitness measurement unit 340 obtains fitness scores for the candidate programs. In some embodiments, a same fitness function, like the function (1) or the function (2), may be used to obtain fitness scores of the parent candidate programs of generation Gp, the child candidate programs in the generation Gp+1, and the initial candidate programs in the $G_0$ generation. In some embodiments, different fitness functions may be used. In some embodiments, a fitness function includes factors related to one or more factors of conciseness of a candidate regular expression (e.g., a length of the candidate regular expression), a first matching rate of the candidate regular expression on the positive example data strings, a second matching rate of the candidate regular expression on the negative example data strings, or an edit distance between the candidate regular expression and an example data string.

In example sub-act 432, optionally, the fitness measurement unit 340 filtered the new candidate programs based on the fitness scores thereof. For example, new candidate programs of a lower fitness score may be removed from the population of the Gp+1 generation of the candidate programs. In some embodiments, the filtering operations are conducted separately for the first subset, the second subset and the third subset of new candidate programs such that the size ratio among the first subset, the second subset and the third subset of new candidate programs is maintained.

The acts 420, 430 are together referred to as a round of genetic operation or evolution. The genetic operation is conducted iteratively, with each round of the genetic operation or evolution generating a new generation of candidate programs. The controller 350 may set up threshold conditions on completing or terminating the iterative genetic operations. For example, a threshold condition includes that a total number of the iteration reaches a threshold number or that a fitness score of a candidate program reaches a threshold fitness score. A threshold condition may also include that a round of genetic operation generates no new benefits. A new benefit includes an improved fitness score, either individually or in average. A new benefit also includes a new candidate program that is different from any existing candidate programs.

In example act 440, the controller 350 determines whether a threshold condition on completing the iterative genetic operations has been met. If none of the threshold conditions are met, the controller 350 controls the genetic operation to continue the iteration. If one or more of the threshold conditions has been met, the controller 350 controls the genetic operation to complete.

In example act 450, after the genetic operation is complete, the program generation module selects a candidate program that has the highest fitness score as the final pattern program. The final pattern program is output to the extraction module 124 to conduct the named entity recognition tasks on the data streams 130.

Figure 5:
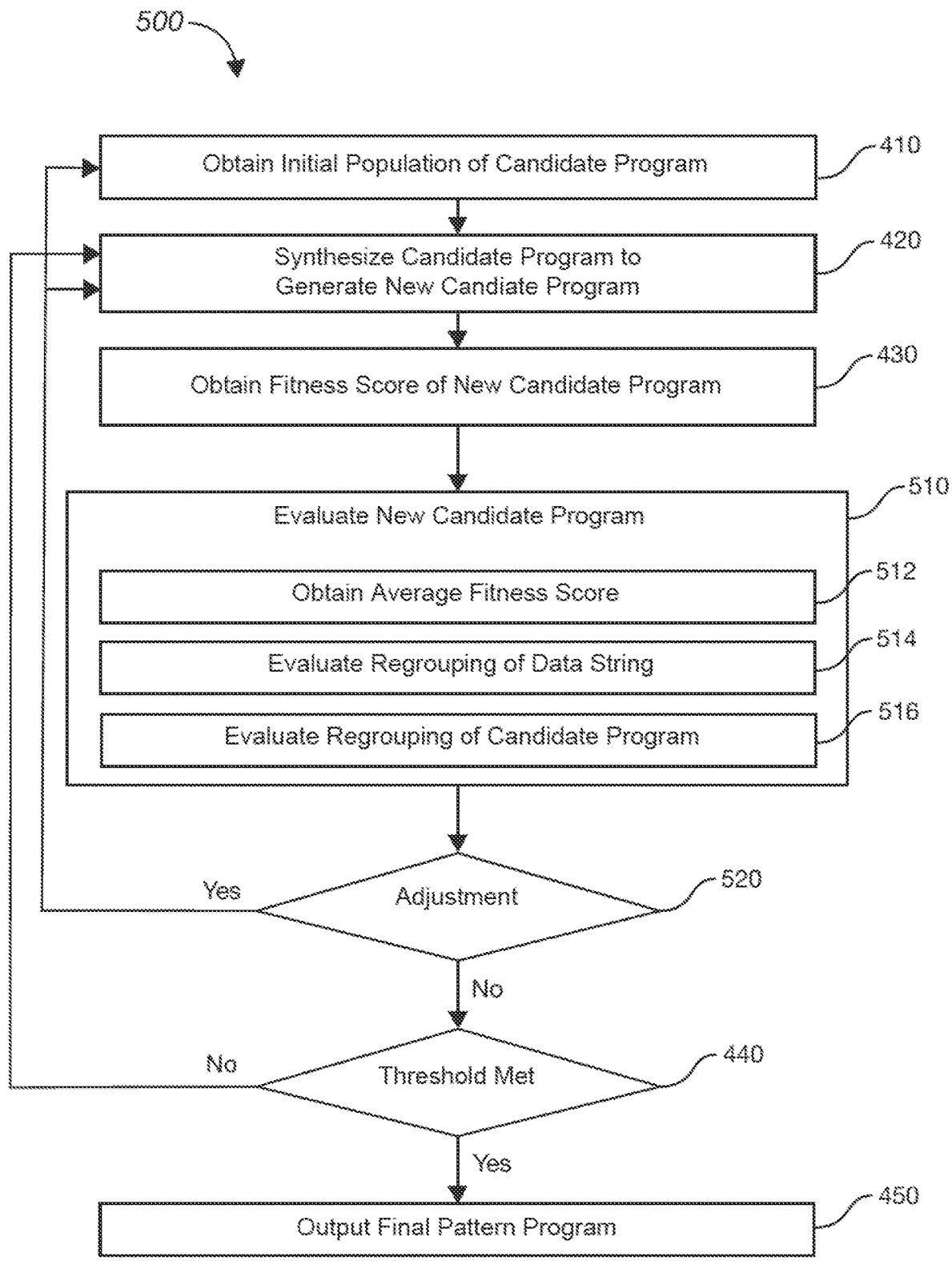
FIG. 5 schematically shows another example process of generating pattern programs using genetic algorithms in accordance with embodiments of this specification.

FIG. 5 shows another example process 500. The process 500 includes additional acts over the example process 400. The example acts 410, 420, 430, 440 and 450 in the example process 500 are similar to those in process 400, the description of which are omitted with respect to the process 500 for simplicity purposes.

After a round of genetic operation, e.g., the acts 420 and 430, is completed, the controller 350 may route the operation to an act 510, where the adjustment unit 352 evaluates the candidate programs generated in the round of genetic operation to determine whether the iterative genetic operation should be adjusted. Specifically, in sub-act 512, the adjustment unit 352 obtains an average fitness score of all the child candidate programs in the Gp+1 generation. The average fitness score is compared to the average fitness score of parent Gp generation of candidate programs. If the average fitness score of the Gp+1 generation is smaller than the average fitness score of the Gp generation, the parameters of the genetic algorithm may be adjusted.

In sub-act 514, the adjustment unit 352 evaluates regrouping the example data strings. In some embodiments, the adjustment unit 352 analyzes each positive example data string regarding whether the positive example data string matches a candidate program in the Gp+1 generation. A match rate is obtained for each positive example data string, which is calculated as a number of matches between the positive example data string and the candidate programs versus a total number of the candidate programs in the Gp+1 generation. A threshold match rate may be set up, e.g., 50% match, by the controller 350. A positive example data string of a match rate higher than the threshold match rate may be regrouped into a "conquered" group indicating that the extraction behaviors or "genes" of the candidate programs of the Gp+1 generation generally fit the specific positive example data string. A positive example data string of a match rate lower than the threshold match rate may be regrouped into an "unconquered" group indicating that the extraction behaviors or "genes" of the candidate programs of the Gp+1 generation generally do not match with the specific positive example data string. The conquered group of positive example data strings may be used in further genetic operations, e.g., in the calculation of fitness scores of candidate programs. The unconquered group of positive example data strings may be used to obtain another pattern program in a separate genetic operation.

In sub-act 516, the adjustment unit 352 evaluates regrouping the candidate programs based on their extraction behaviors on different groups of positive example data strings. For example, the fitness scores and/or the positive match rates of a candidate program are calculated for each group of example data strings. The candidate programs are grouped based on their fitness scores or positive match rates for each group of example data strings. For example, a candidate program may have a 70% match rate for a first group of positive example data strings and a 20% match rate for a second group of positive example data strings. The candidate program may be grouped as a candidate program suitable for extracting target data categories represented by the first group of positive example data strings. A group of candidate programs may be used for the genetic operations within the group. For example, a candidate program may only mate with another candidate program in the same group for the crossover operation.

The regrouping of the example data strings or the candidate programs may lead to that multiple genetic operations are conducted in parallel and multiple final pattern programs are generated from the multiple genetic operations. In some embodiments, the multiple final pattern programs may be linked through "OR" functions in an extraction task.

In example act 520, the controller 350 determines whether an adjustment of the genetic operation should be made based on the evaluation results of the act 510. If it is determined that one or more adjustments should be made, the controller 350 effects the adjustment on the act 410 or the act 420. For example, the regrouping of the positive example data strings may be used to adjust the genetic operations starting at the act 420. For example, multiple genetic operations start to run in parallel. The conquered group and unconquered group of the positive example data strings may also be used to reshape the initial population of candidate programs at the act 410. Other approaches of adjusting the operation of the program generation module 122 are also possible and included in the scope of the specification.

The learning unit 360 is configured to function together with the controller 350 in further training the genetic operations. For example, the training data, e.g., the correct extraction results and the incorrect extraction results, may be used as training data strings. A generation of the candidate programs may be selected as an initial training population of candidate programs to start the training operation. In some embodiments, the last generation of the candidate programs is used as an initial training population. In some embodiments, the processes 400, 500 of FIG. 4 or 5 may be similarly run using the training data strings and on the initial training population of candidate programs. The training operation generates a new final pattern program(s) that overcomes the shortcomings of the previous pattern programs in extracting the incorrect data strings.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

The techniques described in this specification produce one or more technical effects. The genetic algorithm works on data strings that each exactly represents the target data categories of named entity recognition. These technical features bring about valuable technical advantages. First, a pattern program generated from the genetic algorithm will have a tailored extraction behavior because the good "genes" contained in the example data strings are efficiently caught and carried over through the genetic operations of the genetic algorithm. As such, the generated pattern program will correctly detect and extract data strings of the target data categories. Further, using such example data strings also reduces human inputs and errors in the process because there is no need to manually identify named entities from an unrepresentative data string. Also, the initial population of pattern programs is generated largely, e.g., 90%, from the example data strings, which substantially reduces the amount of iterative genetic operations required to achieve a satisfactory pattern program. This saving in computing resources is critical in managing large scale data streams in the era of big data and cloud-based data services.

Moreover, the fitness function considers whether a pattern program matches a negative example data string, which is not a target of a named entity recognition task. Resultantly, a pattern program selected based on the fitness function will avoid data categories that are represented by the negative example data strings. Therefore, the false positive errors will be substantially reduced, which makes the outcomes of the named entity recognition tasks more reliable and meaningful. As such, the techniques of the specification are efficient and suitable for conducting named entity recognition tasks on large scale data streams.

The techniques operate on various example data strings without differentiating among the various example data strings, which generate a pattern program that functions to extract target data categories represented by all the example data strings. As such, the operation of the techniques can be done fully autonomously without human intervention. If the initial efforts of generating a single pattern program fails, the example data strings can be regrouped and the genetic operation parameters can be adjusted based on the evaluation of the previous operation results without human intervention. As such, the techniques generate a computer program, e.g., a regular expression, fully autonomously based on example data strings representative of the data categories to be matched by the regular expression.

Described embodiments of the subject matter can include one or more features, alone or in combination. For example, in a first embodiment, a computer-implemented method obtains a first population of candidate programs; generates a second population of candidate programs by conducting an iterative genetic operation on the first population of candidate programs; and extracts a second plurality of data strings from a data stream using a first candidate program of the second population of candidate programs. The iterative genetic operation includes calculating a fitness score for each candidate program of the second population of candidate programs using a fitness function and a first plurality of data strings. The fitness function evaluates a match rate of a candidate program with the first plurality of data strings;

The foregoing and other described embodiments can each, optionally, include one or more of the following features.

A first feature, combinable with any of the previous or following features, specifies that the method further includes obtaining a third plurality of data strings. The third plurality of data string is a subset of the second plurality of data strings. The method further includes generating a second candidate program by conducting the iterative genetic operation on the second population of candidate programs using the third plurality of data strings.

A second feature, combinable with any of the previous or following features, specifies that the first plurality of data strings include a plurality of positive example data strings each representative of a target data category of a named entity recognition task.

A third feature, combinable with any of the previous or following features, specifies that the first plurality of data strings include a plurality of negative example data strings each representative of a data category that negates the target data category.

A fourth feature, combinable with any of the previous or following features, specifies that the fitness function evaluates a first match rate of the candidate program with respect to the plurality of positive example data strings and a second match rate of the candidate program with respect to the plurality of negative example data strings.

A fifth feature, combinable with any of the previous or following features, specifies that the method further includes grouping the first plurality of data strings into a first group of data strings and at least one second group of data strings, and separately conducting the iterative genetic operation on the first set of candidate programs and using each of the first group of data strings or the at least one second group of data strings.

A sixth feature, combinable with any of the previous or following features, specifies that the fitness function further evaluates a conciseness of the candidate program and an edit distance between the candidate program and a data string of the first plurality of data strings.

A seventh feature, combinable with any of the previous or following features, specifies that the iterative genetic operation includes a crossover operation and a mutation operation.

A eighth feature, combinable with any of the previous or following features, specifies that a candidate program of each of the first population of candidate programs or the second population of candidate programs is a regular expression.

A ninth feature, combinable with any of the previous or following features, specifies that each of the first plurality of data strings is assigned with a weight; and the fitness function evaluates the weight of each of the first plurality of data strings.

A tenth feature, combinable with any of the previous or following features, specifies that the first candidate program has a highest fitness score among the second population of candidate programs; the conducting the iterative genetic operation on the second population of candidate programs using the third plurality of data strings generates a third population of candidate programs; and the second candidate program has a highest fitness score among the third population of candidate programs.

An eleventh feature, combinable with any of the previous or following features, specifies that the second candidate program has a fitness score that is higher than a fitness score of the first candidate program calculated using at least one of the first plurality of data strings and the third plurality of data strings.

A twelfth feature, combinable with any of the previous or following features, specifies that the obtaining the first population of candidate programs includes obtaining at least a portion of the first population of candidate programs based on the first plurality of data strings.

In a second embodiment, a system comprises one or more processors, and one or more computer-readable memories coupled to the one or more processors and having instructions stored thereon that are executable by the one or more processors to perform acts. The acts include receiving, from a user, a first plurality of data strings; obtaining a first population of candidate programs at least partially based on the first plurality of data strings; generating a second population of candidate programs by conducting an iterative genetic operation on the first population of candidate programs, the iterative genetic operation including calculating a fitness score for each candidate program of the second population of candidate programs using a fitness function and the first plurality of data strings; extracting a second plurality of data strings from a data stream using a first candidate program selected from the second population of candidate programs; providing the second plurality of data strings to the user; receiving a third plurality of data strings from the user, the third plurality of data strings being a subset of the second plurality of data strings; and obtaining a second candidate program at least partially based on the third plurality of data strings and the second population of candidate programs.

In a third embodiment, an apparatus comprises a plurality of modules and units. The plurality of modules and units include an initial program generation unit that operates to obtain a first population of candidate programs; a synthesizing unit that operates to generate a second population of candidate programs by conducting an iterative genetic operation on the first population of candidate programs; a fitness measurement unit that operates to calculate a fitness score for each candidate program of the second population of candidate programs using a fitness function and a first plurality of data strings, the fitness function evaluating a match rate of a candidate program with the first plurality of data strings; and an extraction module that operates to extract a second plurality of data strings from a data stream using a first candidate program selected from the first population of candidate programs and the second population of candidate programs.

In a fourth embodiment, a non-transitory computer-readable storage medium stores executable instructions that cause a processor to execute acts comprising: obtaining a first population of candidate programs; generating a second population of candidate programs by conducting an iterative genetic operation on the first population of candidate programs, the iterative genetic operation including calculating a fitness score for each candidate program of the second population of candidate programs using a fitness function and a first plurality of data strings; based on fitness scores of candidate programs of the second population of candidate programs, dividing the first plurality of data strings into a first subset of data strings and at least one second subset of data strings; generating a third population of candidate programs by conducting the iterative genetic operation on the second population of candidate programs using the first subset of data strings; and extracting a second plurality of data strings from a data stream using a first candidate program selected from the third population of candidate programs.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control operation of, data processing apparatus. For example, a computer program carrier can include one or more computer-readable storage media that have instructions encoded or stored thereon. The carrier may be a tangible non-transitory computer-readable medium, such as a magnetic, magneto optical or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively, such as electrically or optically, connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well, for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform operations or actions. For one or more computer programs to be configured to perform particular operations or actions means that the one or more programs include instructions that, when executed by data processing apparatus, cause the apparatus to perform operations or actions. For special-purpose logic circuitry to be configured to perform particular operations or actions means that the circuitry has electronic logic that performs operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiment can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

We claim:

1. A computer-implemented method, the method comprising:
   obtaining a first population of candidate programs;
   generating a second population of candidate programs by conducting an iterative genetic operation on the first population of candidate programs, the iterative genetic operation including calculating a fitness score for each candidate program of the second population of candidate programs using a fitness function and a first plurality of data strings, the fitness function evaluating a match rate of a candidate program with the first plurality of data strings; and
   extracting a second plurality of data strings from a data stream using a first candidate program of the second population of candidate programs,
   wherein the first plurality of data strings include a plurality of positive example data strings each representative of a target data category of a named entity recognition task.

2. The method of claim 1, further comprising:
obtaining a third plurality of data strings, the third plurality of data strings being a subset of the second plurality of data strings; and
generating a second candidate program by conducting the iterative genetic operation on the second population of candidate programs using the third plurality of data strings.

3. The method of claim 1, wherein the first plurality of data strings include a plurality of negative example data strings each representative of a data category that negates the target data category.

4. The method of claim 3, wherein the fitness function evaluates a first match rate of the candidate program with respect to the plurality of positive example data strings and a second match rate of the candidate program with respect to the plurality of negative example data strings.

5. The method of claim 1, further comprising:
grouping the first plurality of data strings into a first group of data strings and at least one second group of data strings; and
separately conducting the iterative genetic operation on the first population of candidate programs and using each of the first group of data strings or the at least one second group of data strings.

6. The method of claim 1, wherein the fitness function further evaluates a conciseness of the candidate program and an edit distance between the candidate program and a data string of the first plurality of data strings.

7. The method of claim 1, wherein the iterative genetic operation includes a crossover operation and a mutation operation.

8. The method of claim 1, wherein a candidate program of each of the first population of candidate programs or the second population of candidate programs is a regular expression.

9. The method of claim 1, wherein:
each of the first plurality of data strings is assigned with a weight; and
the fitness function evaluates the weight of each of the first plurality of data strings.

10. The method of claim 2, wherein:
the first candidate program has a highest fitness score among the second population of candidate programs;
the conducting the iterative genetic operation on the second population of candidate programs using the third plurality of data strings generates a third population of candidate programs; and
the second candidate program has a highest fitness score among the third population of candidate programs.

11. The method of claim 10, wherein the second candidate program has a fitness score that is higher than a fitness score of the first candidate program calculated using at least one of the first plurality of data strings and the third plurality of data strings.

12. The method of claim 1, wherein the obtaining the first population of candidate programs includes obtaining at least a portion of the first population of candidate programs based on the first plurality of data strings.

13. A system, comprising:
one or more processors; and
one or more computer-readable memories coupled to the one or more processors and having instructions stored thereon that are executable by the one or more processors to perform acts including:
obtaining a first population of candidate programs;
generating a second population of candidate programs by conducting an iterative genetic operation on the first population of candidate programs, the iterative genetic operation including calculating a fitness score for each candidate program of the second population of candidate programs using a fitness function and a first plurality of data strings, the fitness function evaluating a match rate of a candidate program with the first plurality of data strings; and
extracting a second plurality of data strings from a data stream using a first candidate program of the second population of candidate programs,
wherein the first plurality of data strings include a plurality of positive example data strings each representative of a target data category of a named entity recognition task.

14. The system of claim 13, wherein the acts include:
obtaining a third plurality of data strings, the third plurality of data strings being a subset of the second plurality of data strings; and
generating a second candidate program by conducting the iterative genetic operation on the second population of candidate programs using the third plurality of data strings.

15. The system of claim 13, wherein the first plurality of data strings include a plurality of negative example data strings each representative of a data category that negates the target data category.

16. The system of claim 15, wherein the fitness function evaluates a first match rate of the candidate program with respect to the plurality of positive example data strings and a second match rate of the candidate program with respect to the plurality of negative example data strings.

17. The system of claim 13, wherein the acts further comprise:
grouping the first plurality of data strings into a first group of data strings and at least one second group of data strings; and
separately conducting the iterative genetic operation on the first population of candidate programs and using each of the first group of data strings or the at least one second group of data strings.

18. An apparatus, the apparatus comprising:
an initial group generation unit that obtains a first population of candidate programs;
a synthesizing unit that generates a second population of candidate programs by conducting an iterative genetic operation on the first population of candidate programs, the iterative genetic operation including calculating a fitness score for each candidate program of the second population of candidate programs using a fitness function and a first plurality of data strings, the fitness function evaluating a match rate of a candidate program with the first plurality of data strings; and
an extraction module that extracts a second plurality of data strings from a data stream using a first candidate program of the second population of candidate programs,
wherein the first plurality of data strings include a plurality of positive example data strings each representative of a target data category of a named entity recognition task.

19. The apparatus of claim 18, wherein the fitness function evaluates a conciseness of the candidate program and an edit distance between the candidate program and a data string of the first plurality of data strings.

20. The apparatus of claim 18, wherein the first plurality of data strings include a plurality of negative example data strings each representative of a data category that negates the target data category; and wherein the fitness function evaluates a first match rate of the candidate program with respect to the plurality of positive example data strings and a second match rate of the candidate program with respect to the plurality of negative example data strings.

* * * * *